US011458951B2

(12) United States Patent
Nabeshima et al.

(10) Patent No.: US 11,458,951 B2
(45) Date of Patent: Oct. 4, 2022

(54) DRIVING SYSTEM

(71) Applicant: SUBARU CORPORATION, Tokyo (JP)

(72) Inventors: Akihiro Nabeshima, Tokyo (JP); Tomoaki Sugiura, Tokyo (JP); Satoshi Inoue, Tokyo (JP); Takuya Machida, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 305 days.

(21) Appl. No.: 16/736,491

(22) Filed: Jan. 7, 2020

(65) Prior Publication Data
US 2020/0298828 A1 Sep. 24, 2020

(30) Foreign Application Priority Data
Mar. 20, 2019 (JP) .............................. JP2019-052708

(51) Int. Cl.
B60W 20/15 (2016.01)
B60K 6/28 (2007.10)
B60K 6/26 (2007.10)
B60K 6/24 (2007.10)
B60W 10/10 (2012.01)
B60W 10/06 (2006.01)
(Continued)

(52) U.S. Cl.
CPC ............... B60W 20/15 (2016.01); B60K 6/24 (2013.01); B60K 6/26 (2013.01); B60K 6/28 (2013.01); B60K 6/36 (2013.01); B60W 10/06 (2013.01); B60W 10/08 (2013.01); B60W 10/10 (2013.01); B60Y 2200/92 (2013.01); B60Y 2300/52 (2013.01)

(58) Field of Classification Search
CPC ...... B60W 10/06; B60W 10/08; B60W 10/26; B60W 20/15; B60W 20/40; B60K 6/24; B60K 6/26; B60K 6/28; B60K 6/36
See application file for complete search history.

(56) References Cited

U.S. PATENT DOCUMENTS 5,862,497 A * 1/1999 Yano ...................... B60K 6/547
701/22
5,899,828 A * 5/1999 Yamazaki ............. B60W 10/08
477/4

(Continued)

FOREIGN PATENT DOCUMENTS

JP 2014-205384 A 10/2014

Primary Examiner — Jeffrey J Restifo
(74) Attorney, Agent, or Firm — McDermott Will & Emery LLP

(57) ABSTRACT

A driving system includes an engine, a motor generator, an output unit, a power transmission mechanism, and a controller. The output unit outputs at least one of an engine driving force generated by the engine or a motor driving force generated by the motor generator. The power transmission mechanism selects a first drive mode in which both of the engine driving force and the motor driving force are transmitted to the output unit, and a second drive mode in which only the engine driving force is transmitted to the output unit. The controller controls the power transmission mechanism to select the first drive mode when a first fuel consumption rate of the engine in the first drive mode is or is estimated to be lower than a second fuel consumption rate of the engine in the second drive mode.

13 Claims, 8 Drawing Sheets

(51) Int. Cl.
*B60W 10/08* (2006.01)
*B60K 6/36* (2007.10)

(56) References Cited

U.S. PATENT DOCUMENTS

| | | | | |
|---|---|---|---|---|
| 6,232,733 | B1* | 5/2001 | Obayashi | B60L 15/2045 |
| | | | | 318/432 |
| 6,269,290 | B1* | 7/2001 | Egami | B60K 6/26 |
| | | | | 701/22 |
| 6,570,265 | B1* | 5/2003 | Shiraishi | B60W 10/08 |
| | | | | 290/40 C |
| 11,097,721 | B1* | 8/2021 | Zhao | B60W 10/08 |
| 2002/0062183 | A1* | 5/2002 | Yamaguchi | B60W 20/10 |
| | | | | 701/22 |
| 2004/0251065 | A1* | 12/2004 | Komiyama | B60W 10/06 |
| | | | | 180/65.23 |
| 2009/0105924 | A1* | 4/2009 | Kamichi | B60K 6/365 |
| | | | | 701/99 |
| 2010/0030416 | A1* | 2/2010 | Jinno | B60L 15/2045 |
| | | | | 701/22 |
| 2010/0179714 | A1* | 7/2010 | Tani | B60W 10/08 |
| | | | | 701/22 |
| 2011/0118921 | A1* | 5/2011 | Park | B60W 30/18127 |
| | | | | 701/22 |
| 2013/0151056 | A1* | 6/2013 | Nakano | B60W 20/00 |
| | | | | 701/22 |
| 2013/0211655 | A1* | 8/2013 | Ogata | E02F 9/2292 |
| | | | | 701/22 |
| 2013/0221751 | A1* | 8/2013 | Miyakawa | B60L 50/16 |
| | | | | 307/72 |
| 2014/0303820 | A1* | 10/2014 | Aoki | B60W 20/13 |
| | | | | 701/22 |
| 2014/0309079 | A1* | 10/2014 | Tabata | B60K 6/485 |
| | | | | 477/5 |
| 2017/0197611 | A1* | 7/2017 | Yamazaki | B60W 20/11 |
| 2018/0229715 | A1* | 8/2018 | Kinoshita | B60W 10/06 |
| 2018/0236996 | A1* | 8/2018 | Oba | B60W 20/11 |
| 2018/0290645 | A1* | 10/2018 | Zhao | B60W 20/11 |
| 2019/0322269 | A1* | 10/2019 | Sasaki | B60W 10/06 |
| 2020/0180598 | A1* | 6/2020 | Park | B60W 20/11 |
| 2020/0298828 | A1* | 9/2020 | Nabeshima | B60W 20/13 |
| 2020/0398655 | A1* | 12/2020 | Li | B60K 6/40 |
| 2021/0179063 | A1* | 6/2021 | Tokura | B60W 10/08 |

* cited by examiner

|  | LOW-SPEED GEAR 37 SELECTED | HIGH-SPEED GEAR 38 SELECTED |
|---|---|---|
| CLUTCH C0 | ENGAGED | ENGAGED |
| CLUTCH C1 | DISENGAGED | DISENGAGED |
| CLUTCH C2 | ENGAGED | DISENGAGED |
| CLUTCH C3 | DISENGAGED | ENGAGED |

| | LOW-SPEED GEAR 37 SELECTED | HIGH-SPEED GEAR 38 SELECTED |
|---|---|---|
| CLUTCH C0 | ENGAGED | ENGAGED |
| CLUTCH C1 | ENGAGED | ENGAGED |
| CLUTCH C2 | ENGAGED | DISENGAGED |
| CLUTCH C3 | DISENGAGED | ENGAGED |

|  | LOW-SPEED GEAR 37 SELECTED | HIGH-SPEED GEAR 38 SELECTED |
|---|---|---|
| CLUTCH C0 | DISENGAGED | DISENGAGED |
| CLUTCH C1 | ENGAGED | ENGAGED |
| CLUTCH C2 | ENGAGED | DISENGAGED |
| CLUTCH C3 | DISENGAGED | ENGAGED |

FIG. 4C

DRIVING SYSTEM

CROSS-REFERENCE TO RELATED APPLICATIONS

The present application claims priority from Japanese Patent Application No. 2019-052708 filed on Mar. 20, 2019, the entire contents of which are hereby incorporated by reference.

BACKGROUND

The technology relates to a driving system to be mounted on a driving apparatus of a movable body such as a vehicle.

An apparatus that controls a hybrid electric vehicle has been developed that performs, on the basis of a fuel consumption rate, switching between an electric travel mode in which only a motor is driven and a hybrid travel mode in which an engine is driven. Reference is made to Japanese Unexamined Patent Application Publication No. 2014-205384, for example.

SUMMARY

An aspect of the technology provides a driving system including an engine, a motor generator, an output unit, a power transmission mechanism, and a controller. The engine is configured to generate an engine driving force. The motor generator is configured to generate a motor driving force. The output unit is configured to output at least one of the engine driving force or the motor driving force. The power transmission mechanism is configured to select a first drive mode and a second drive mode. The first drive mode is a mode in which both of the engine driving force and the motor driving force are transmitted to the output unit, and the second drive mode is a mode in which only the engine driving force, out of the engine driving force and the motor driving force, is transmitted to the output unit. The controller is configured to control the power transmission mechanism to select the first drive mode, either one of when a first fuel consumption rate of the engine in the first drive mode is lower than a second fuel consumption rate of the engine in the second drive mode, and when the first fuel consumption rate of the engine in the first drive mode is estimated to be lower than the second fuel consumption rate of the engine in the second drive mode.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 4C is a table illustrating states of clutches in the third drive mode.

DETAILED DESCRIPTION

Figure 1:
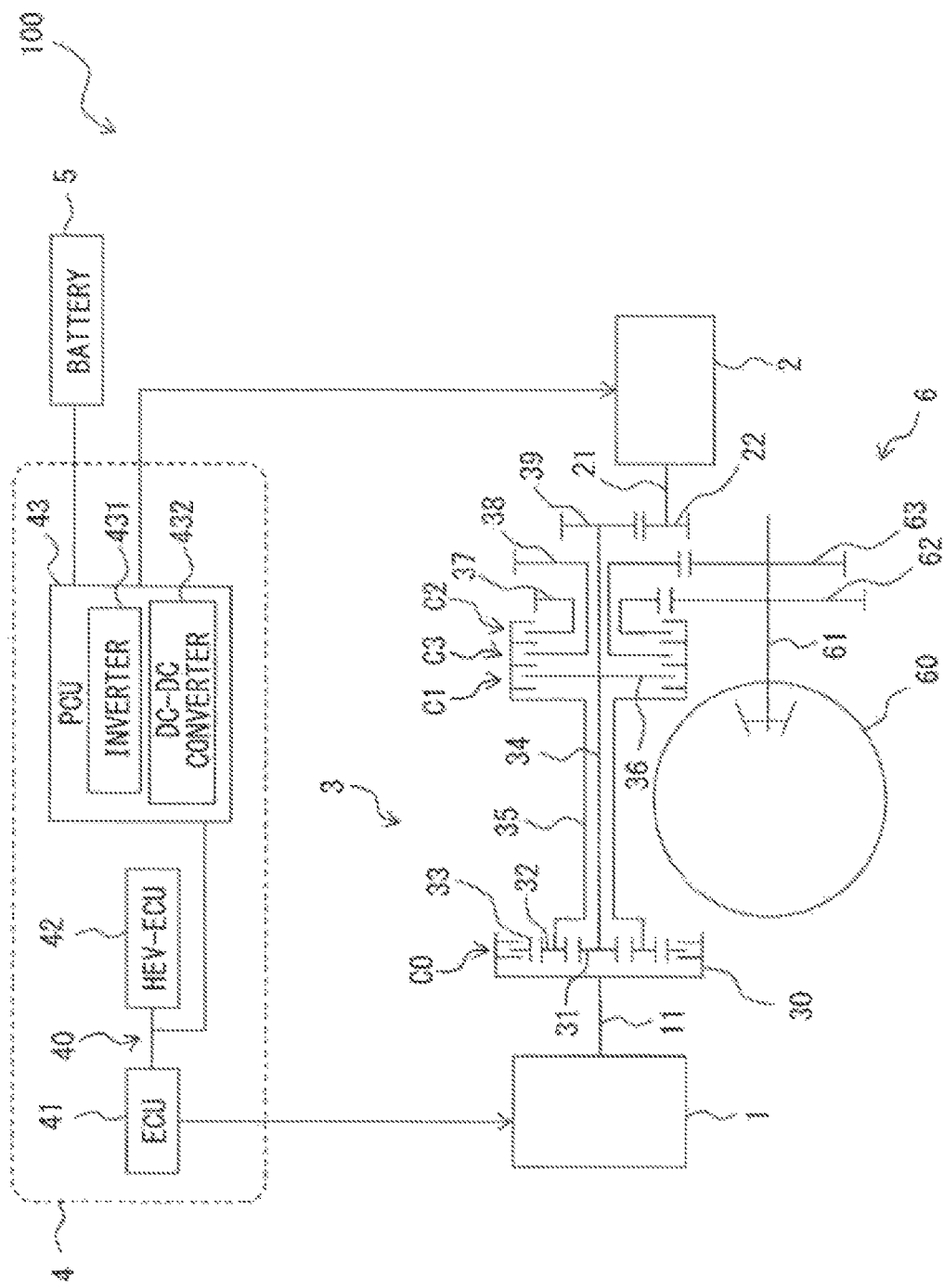
FIG. 1 is a schematic view illustrating an example of an outline configuration of a vehicle driving system according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description. The description is given in the following order.

1. Example Embodiment (An example of a vehicle driving system including a power transmission mechanism performing, on the basis of a fuel consumption rate, switching between a power-split drive mode and an engine-directly-coupled drive mode)
   1.1 Outline Configuration of Vehicle Driving System
   1.2 Drive modes in Vehicle Driving System
   1.3 Control in Vehicle Driving System
   1.4 Workings and Example Effects of Vehicle Driving System
2. Modification Examples In a driving system of a hybrid electric vehicle including a motor and an engine, there is a possibility that a fuel consumption rate of the engine may possibly increase depending on a traveling state of the vehicle.

It is desirable to provide a driving system that makes it possible to reduce fuel consumption of an engine.

1. Example Embodiment

[1.1 Outline Configuration of Vehicle Driving System 100]

FIG. 1 schematically illustrates an example of an outline configuration of a power transmission system in a vehicle driving system 100 according to an embodiment of the technology. The vehicle driving system 100 may be mounted on a hybrid electric vehicle that has an engine 1 and a motor generator (MG) 2, and the vehicle driving system 100 may drive the vehicle. Hereinafter, the hybrid electric vehicle may be simply referred to as a "vehicle". As illustrated in FIG. 1, the vehicle driving system 100 includes the engine 1, the MG 2, a power transmission mechanism 3, a controller 4, and an output unit 6. The vehicle driving system 100 may also include a battery 5.

[Engine 1]

The engine 1 may be an internal combustion engine that generates an engine driving force by combusting a fuel such as gasoline. An engine output shaft 11 may be provided between the engine 1 and the power transmission mechanism 3. The engine output shaft 11 may be rotated by the driving force of the engine 1. The engine output shaft 11 may have a first end coupled to the engine 1 and a second end coupled to the power transmission mechanism 3. In one embodiment, the engine 1 may serve as an "engine".

[MG 2]

The MG 2 may be a driving source that generates a motor driving force that drives the vehicle by using electric power supplied by the battery 5. The MG 2 may also be an electricity generator that charges the battery 5 by being driven by using the engine driving force of the engine 1. The MG 2 may include an input-output shaft 21 that rotates integratedly with a rotor in the MG 2 and a gear 22 that is fixed to the input-output shaft 21. The MG 2 may be, for example, a three-phase alternating-current synchronous motor. However, the MG 2 is not limited to an alternating-current synchronous motor, and may be an alternating-current induction motor or a direct-current motor. In one embodiment, the MG 2 may serve as a "motor generator".

[Power Transmission Mechanism 3]

The power transmission mechanism 3 is configured to select a power-split drive mode and an engine-directly-coupled drive mode. Hereinafter, the power-split drive mode may be referred to as a "PS drive mode". In one embodiment, the power-split drive mode may serve as a "first drive mode". In one embodiment, the engine-directly-coupled drive mode may serve as a "second drive mode". In the PS drive mode, the power transmission mechanism 3 transmits both of the engine driving force generated in the engine 1 and the motor driving force generated in the MG 2 to the output unit 6. In the engine-directly-coupled drive mode, the power transmission mechanism 3 transmits only the engine driving force, out of the engine driving force and the motor driving force, to the output unit 6. The PS drive mode and the engine-directly-coupled drive mode will each be described in detail later. In one embodiment, the power transmission mechanism 3 may serve as a "power transmission mechanism".

The power transmission mechanism 3 may include, for example, a power transmitter 30, a sun gear 31, a pinion gear 32, a ring gear 33, a driving shaft 34, a carrier 35, a disc 36, a low-speed gear 37, a high-speed gear 38, and a gear 39. Of those, the sun gear 31, the pinion gear 32, and the ring gear 33 may each have a planetary gear mechanism. The sun gear 31 may be fixed to a first end of the driving shaft 34, and the gear 39 may be fixed to a second end of the driving shaft 34. The disc 36 may be fixed to the driving shaft 34, between the sun gear 31 and the gear 39. Further, the carrier 35 may be coupled to the pinion gear 32.

The power transmitter 30 may be coupled to a second end of the engine output shaft 11, and may rotate integratedly with the engine output shaft 11. Further, the power transmitter 30 may be engaged with the ring gear 33 via a clutch C0, thus, the power transmitter 30 and the ring gear 33 may rotate integratedly.

In the power transmission mechanism 3, the disc 36 and the carrier 35 may be engaged with each other via a clutch C1, thus, the sun gear 31, the pinion gear 32, the ring gear 33, the driving shaft 34, and the carrier 35 may rotate integratedly.

Further, in the power transmission mechanism 3, the low-speed gear 37 and the carrier 35 may be engaged with each other via the clutch C2, thus, the low-speed gear 37 and the carrier 35 may rotate integratedly. Still further, in the power transmission mechanism 3, the high-speed gear 38 and the carrier 35 may be engaged with each other via a clutch C3, thus, the high-speed gear 38 and the carrier 35 may rotate integratedly. It is to be noted that one of the clutch C2 and the clutch C3 may be engaged selectively. That is, when the clutch C2 is engaged, the clutch C3 may be disengaged, and when the clutch C3 is engaged, the clutch C2 may be disengaged. The low-speed gear 37 may be meshed with a gear 62 fixed to an output shaft 61. Therefore, with the rotation of the low-speed gear 37, the output shaft 61 may rotate via the gear 62. The high-speed gear 38 may be meshed with a gear 63 fixed to the output shaft 61. Therefore, with the rotation of the high-speed gear 38, the output shaft 61 may rotate via the gear 63. The output shaft 61, the gear 62, and the gear 63 will each be described later.

Moreover, the gear 39 fixed to a second end of the sun gear 31 may be meshed with the gear 22. Therefore, in a case where the clutch C0 is engaged and the clutch C1 is disengaged, the engine driving force transmitted from the engine 1 to the gear 39 via the engine output shaft 11, the ring gear 33, the pinion gear 32, the sun gear 31, and the driving shaft 34 may be inputted to the MG 2 via the gear 22 and the input-output shaft 21. In this case, the MG 2 may operate as the electricity generator, and may be driven by using the engine driving force of the engine 1, to thereby charge the battery 5.

[Controller 4]

The controller 4 included in the vehicle driving system 100 may further include a controller area network (CAN) 40, an engine control unit 41, a hybrid electric vehicle control unit 42, and a power control unit 43. Hereinafter, the engine control unit 41 may be simply referred to as an "ECU 41", the hybrid electric vehicle control unit 42 may be simply referred to as an "HEV-ECU 42", and the power control unit 43 may be simply referred to as a "PCU 43".

The engine 1 may include, for example, a fuel injection device, an ignition device, and a throttle valve, and the operation of the engine 1 may be controlled by the ECU 41. The ECU 41 may be coupled to various types of sensors including a crank angle sensor, an accelerator pedal sensor, and a coolant temperature sensor. The crank angle sensor may measure a rotation position of the engine output shaft 11 or the number of rotations of the engine 1. The accelerator pedal sensor may measure a stepped-down amount of an accelerator pedal, that is, a position of the accelerator pedal. The coolant temperature sensor may measure a temperature of a coolant of the engine 1.

The ECU 41 may control the engine 1 by controlling various types of devices including the fuel injection device, the ignition device, and the throttle valve, on the basis of various pieces of data obtained from these devices and control data from the HEV-ECU 42. The ECU 41 may transmit various pieces of data including the position of the accelerator pedal, the number of rotations of the engine 1, and the temperature of the coolant, to the HEV-ECU 42 via the CAN 40.

The engine 1 and the MG 2 may serve as driving power sources and may be generally controlled by the HEV-ECU 42. The HEV-ECU 42 may include, for example, a microprocessor, a read-only memory (ROM), a random-access memory (RAM), a backup RAM, and an input-output interface (I/F). The microprocessor may perform arithmetic operation. The ROM may hold data such as a program that causes the microprocessor to execute various processes. The RAM may hold various pieces of data such as a result of the arithmetic operation. The backup RAM may hold contents of the stored data.

The HEV-ECU 42 may be coupled to various types of sensors including an outside-temperature sensor, a vehicle speed sensor, and a state of charge sensor. The outside-temperature sensor may measure a temperature of outside air. The vehicle speed sensor may measure a speed of the vehicle. The state of charge sensor may measure a state of charge of the battery 5. The HEV-ECU 42 may be also coupled to units such as the ECU 41 or a vehicle dynamic control unit via the CAN 40 in a mutually communicable manner. The ECU 41 may control the engine 1. The vehicle dynamic control unit may be referred to as a "VDCU", hereinafter. The HEV-ECU 42 may receive various pieces of data such as the number of rotations of the engine 1, the temperature of the coolant, and the position of the accelerator pedal from the ECU 41 and the VDCU via the CAN 40.

The HEV-ECU 42 may generally control driving of the engine 1 and the MG 2 on the basis of the obtained various pieces of data. The HEV-ECU 42 may calculate a requested output of the engine 1 and a torque command value of the MG 2 on the basis of factors including: the position of the accelerator pedal, which reflects driving force requested by a driver; a driving state of the vehicle including a vehicle speed and a traveling load on the vehicle; and the state of charge (SOC) of the battery 5. The HEV-ECU 42 may output results of these calculations.

Further, the HEV-ECU 42 may calculate or estimate fuel consumption per unit time of the engine 1, that is, a fuel consumption rate, on the basis of the obtained various pieces of data. In one example, the HEV-ECU 42 may compare a fuel consumption rate FC1 of the engine 1 in the PS drive mode with a fuel consumption rate FC2 of the engine 1 in the engine-directly-coupled drive mode. The fuel consumption rate FC1 is a fuel consumption rate of the engine 1 in the PS drive mode, and the fuel consumption rate FC2 is a fuel consumption rate of the engine 1 in the engine-directly-coupled drive mode. In one embodiment, the fuel consumption rate FC1 may serve as a "first fuel consumption rate". In one embodiment, the fuel consumption rate FC2 may serve as a "second fuel consumption rate". For example, the HEV-ECU 42 controls the power transmission mechanism 3 to select the PS drive mode, either one of when the fuel consumption rate FC1 is lower than the fuel consumption rate FC2, and when the fuel consumption rate FC1 is estimated to be lower than the fuel consumption rate FC2.

Moreover, the HEV-ECU 42 may control, when a traveling speed of a vehicle is lower than or equal to a first speed, for example, lower than or equal to 25 km/h, the power transmission mechanism 3 to select the PS drive mode regardless of a magnitude relation between the fuel consumption rate FC1 and the fuel consumption rate FC2.

The ECU 41 may adjust, for example, a position of a throttle valve of the engine 1 on the basis of the above-described requested output of the engine 1 which is outputted from the HEV-ECU 42. The PCU 43 may drive the MG 2 via an inverter 431 on the basis of the above-described torque command values outputted from the HEV-ECU 42. The inverter 431 will be described later.

The PCU 43 may include, for example, the inverter 431 and a DC-DC converter 432. The inverter 431 may convert direct-current electric power from the battery 5 into three-phase alternating-current electric power and may supply the MG 2 with the three-phase alternating-current electric power. As described above, the PCU 43 may drive the MG 2 via the inverter 431 on the basis of the torque command value received from the HEV-ECU 42. The inverter 431 may convert alternating-current voltage generated by the MG 2 into direct-current voltage and may charge the battery 5. The DC-DC converter 432 may make direct-current high voltage of the battery 5 drop to, for example, 12 V in order to use the battery 5 as a power source of auxiliary devices and each of the ECU 41 and the HEV-ECU 42.

[Output Unit 6]

The output unit 6 may include the output shaft 61, the gear 62, and the gear 63. The gear 62 and the gear 63 may each be fixed to the output shaft 61 and rotatable about the output shaft 61. The output unit 6 is configured to output at least one of the engine driving force or the motor driving force transmitted via the power transmission mechanism 3. Hereinafter, the engine driving force and the motor driving force may each be simply referred to as a "driving force". In one example, the output shaft 61 may be coupled to the front differential 60, for example, and may transmit the driving force transmitted via the power transmission mechanism 3 to the front differential 60. The front differential 60 may be rotationally driven by the driving force transmitted by the output shaft 61. In one embodiment, the output unit 6 may serve as an "output unit".

[1.2 Drive Modes in Vehicle Driving System 100]

Figure 2A:
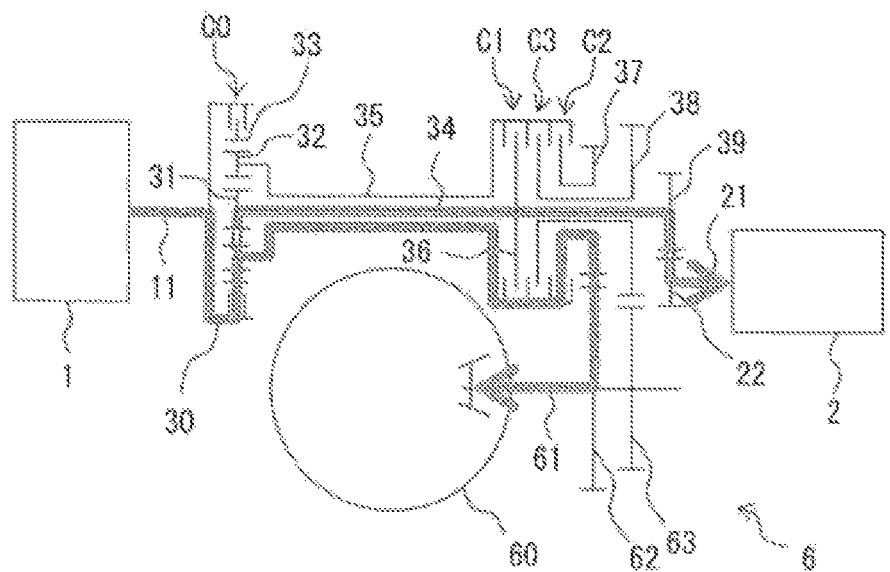
FIG. 2A is a first schematic diagram for explaining a power transmission path of a first drive mode in the vehicle driving system illustrated in FIG. 1.
Figure 2B:
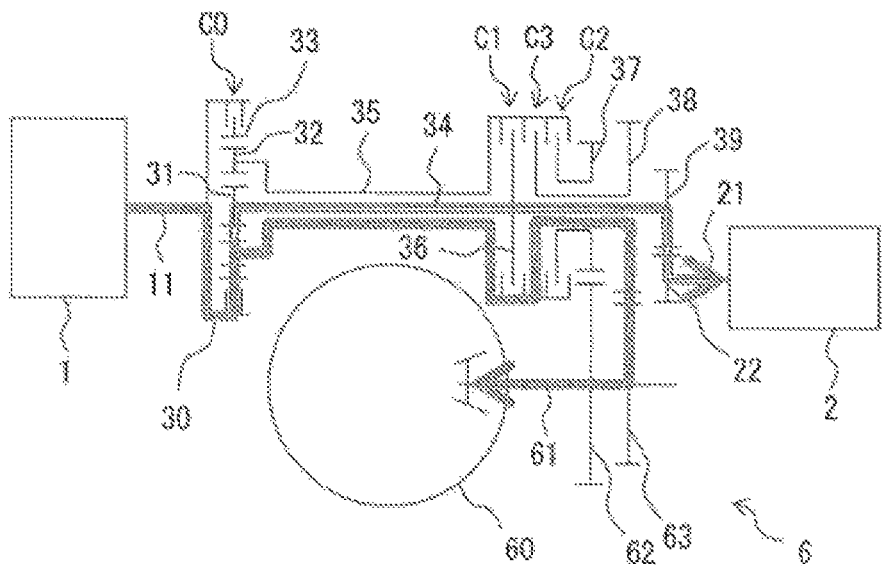
FIG. 2B is a second schematic diagram for explaining a power transmission path of the first drive mode in the vehicle driving system illustrated in FIG. 1.
Figures 2C, 3A:
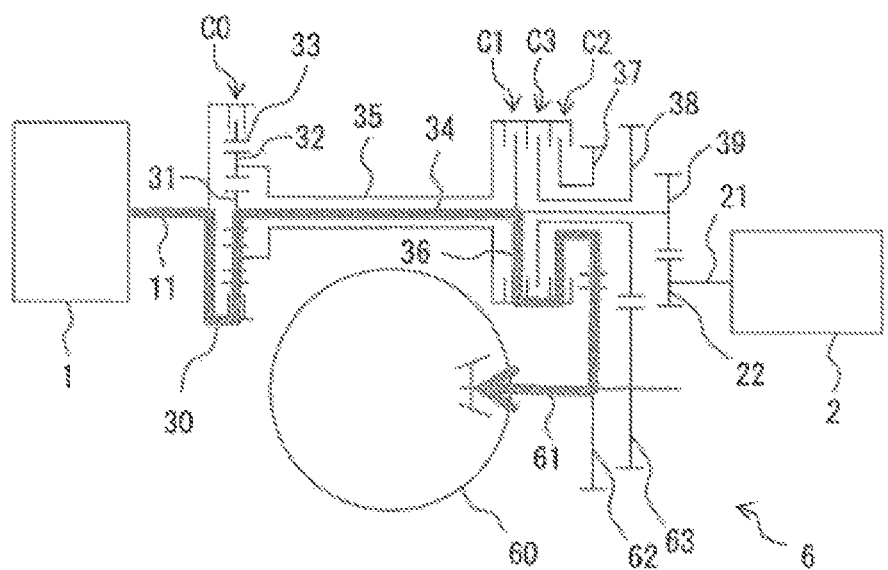
FIG. 2C is a table illustrating states of clutches in the first drive mode.
FIG. 3A is a first schematic diagram for explaining a power transmission path of a second drive mode in the vehicle driving system illustrated in FIG. 1.
Figures 3B, 3C:
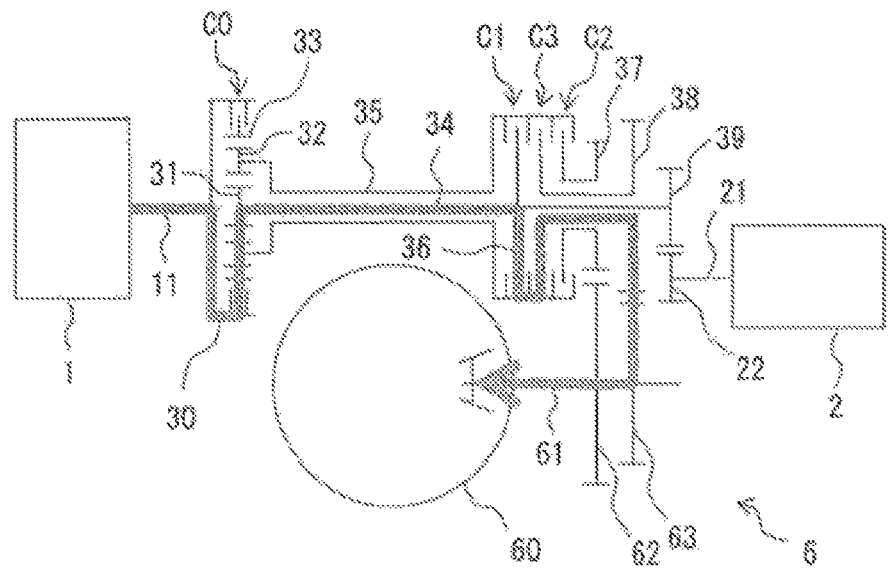
FIG. 3B is a second schematic diagram for explaining a power transmission path of the second drive mode in the vehicle driving system illustrated in FIG. 1.
FIG. 3C is a table illustrating states of clutches in the second drive mode.
Figure 4A:
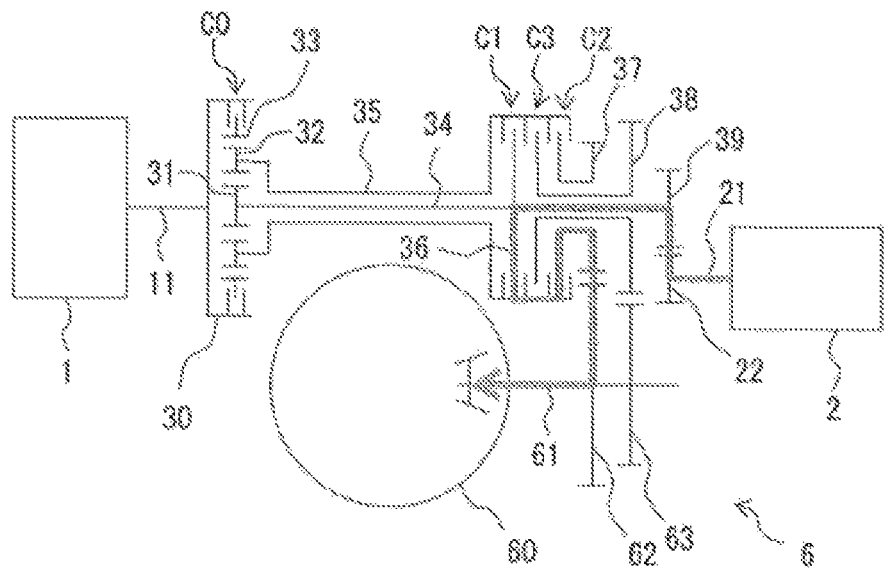
FIG. 4A is a first schematic diagram for explaining a power transmission path of a third drive mode in the vehicle driving system illustrated in FIG. 1.
Figure 4B:
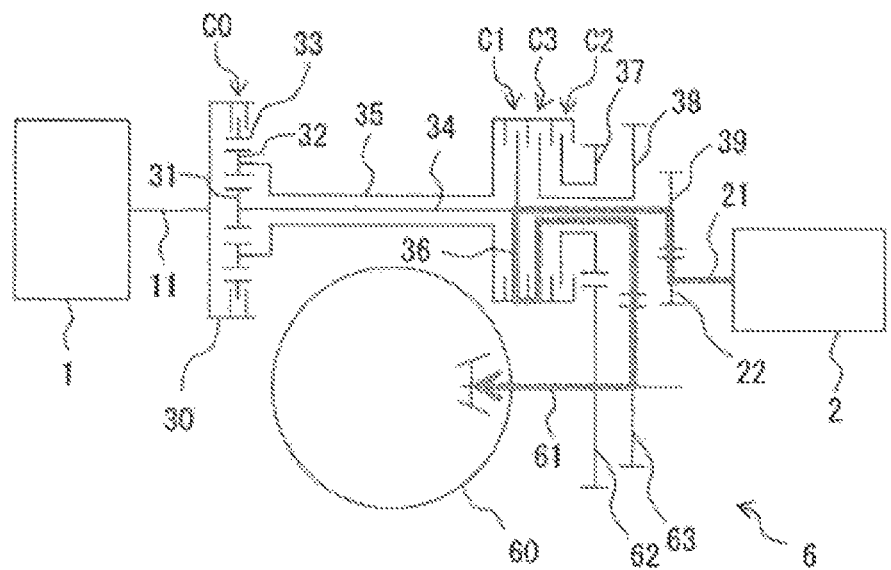
FIG. 4B is a second schematic diagram for explaining a power transmission path of the third drive mode in the vehicle driving system illustrated in FIG. 1.

Next, with reference to FIGS. 2A to 4C, drive modes that the vehicle driving system 100 is able to select will be described. The vehicle driving system 100 according to the example embodiment may take the PS drive mode serving as the first drive mode illustrated in FIGS. 2A to 2C, the engine-directly-coupled drive mode serving as the second drive mode illustrated in FIGS. 3A to 3C, and an electric drive mode serving as a third drive mode illustrated in FIGS. 4A to 4C. FIGS. 2A and 2B are each a schematic diagram for explaining a power transmission path of the PS drive mode, and FIG. 2C is a table in which states of clutches C0 to C3 in the PS drive mode of FIGS. 2A and 2B are written. FIGS. 3A and 3B are each a schematic diagram for explaining a power transmission path of the engine-directly-coupled drive mode, and FIG. 3C is a table in which states of clutches C0 to C3 in the engine-directly-coupled drive mode of FIGS. 3A and 3B are written. FIGS. 4A and 4B are each a schematic diagram for explaining a power transmission path of the electric drive mode, and FIG. 4C is a table in which states of clutches C0 to C3 in the electric drive mode of FIGS. 4A and 4B are written. FIGS. 2A, 3A, and 4A each illustrate the power transmission path when the low-speed gear 37 is being selected, and FIGS. 2B, 3B, and 4B each illustrate the power transmission path when the high-speed gear 38 is being selected.

As illustrated in FIGS. 2A to 2C, in the PS drive mode, the clutch C0 may be in an engaged state and the clutch C1 may be in a disengaged state, thus, the engine driving force of the engine 1 may be transmitted to the front differential 60. That is, the engine driving force inputted to the power transmitter 30 via the engine output shaft 11 may be transmitted to the front differential 60 via the ring gear 33, the pinion gear 32, the carrier 35, the low-speed gear 37 or the high-speed gear 38, the gear 62 or the gear 63, and the output shaft 61. In the PS drive mode, in a case where the low-speed gear 37 is being selected, the clutch C2 may be in the engaged state and the clutch C3 may be in the disengaged state. Alternatively, in a case where the high-speed gear 38 is being selected, the clutch C3 may be in the engaged state and the clutch C2 may be in the disengaged state.

Further, in the PS drive mode, counter-clockwise rotation of the MG 2 may cause some of the engine driving force to be inputted to the MG 2 via the sun gear 31, the driving shaft 34, the gear 39, the gear 22, and the input-output shaft 21. In this case, the MG 2 may operate as the electricity generator, and may charge the battery 5. Alternatively, clockwise rotation of the MG 2 may cause the MG 2 to be driven by electric power of the battery 5. As a result, the motor driving force of the MG 2 may be transmitted to the pinion gear 32 via the input-output shaft 21, the gear 22, the gear 39, the driving shaft 34, and the sun gear 31, and may assist the rotation of the carrier 35.

As illustrated in FIGS. 3A to 3C, in the engine-directly-coupled drive mode, the clutch C0 may be in the engaged state and the clutch C1 may also be in the engaged state. Accordingly, in the engine-directly-coupled drive mode, the engine driving force of the engine 1 may be transmitted to the front differential 60 only. In the engine-directly-coupled drive mode, in a case where the low-speed gear 37 is being selected, the clutch C2 may be in the engaged state and the clutch C3 may be in the disengaged state, as in the case of the PS drive mode. Alternatively, in a case where the high-speed gear 38 is being selected, the clutch C3 may be in the engaged state and the clutch C2 may be in the disengaged state.

As illustrated in FIGS. 4A to 4C, in the electric drive mode, the clutch C0 may be in the disengaged state and the clutch C1 may be in the engaged state. Accordingly, in the electric drive mode, the engine driving force of the engine 1 may not necessarily be transmitted to the front differential 60 and the MG 2, and the motor driving force of the MG 2 that is driven by the electric power of the battery 5 may be transmitted to the front differential 60. In one example, the motor driving force generated by the MG 2 may be transmitted to the front differential 60 via the input-output shaft 21, the gear 22, the gear 39, the driving shaft 34, the disc 36, the carrier 35, the low-speed gear 37 or the high-speed gear 38, the gear 62 or the gear 63, and the output shaft 61. In the electric drive mode, in a case where the low-speed gear 37 is being selected, the clutch C2 may be in the engaged state and the clutch C3 may be in the disengaged state, as in the case of the PS drive mode. Alternatively, in a case where the high-speed gear 38 is being selected, the clutch C3 may be in the engaged state and the clutch C2 may be in the disengaged state.

[1.3 Control in Vehicle Driving System]

Figure 5:
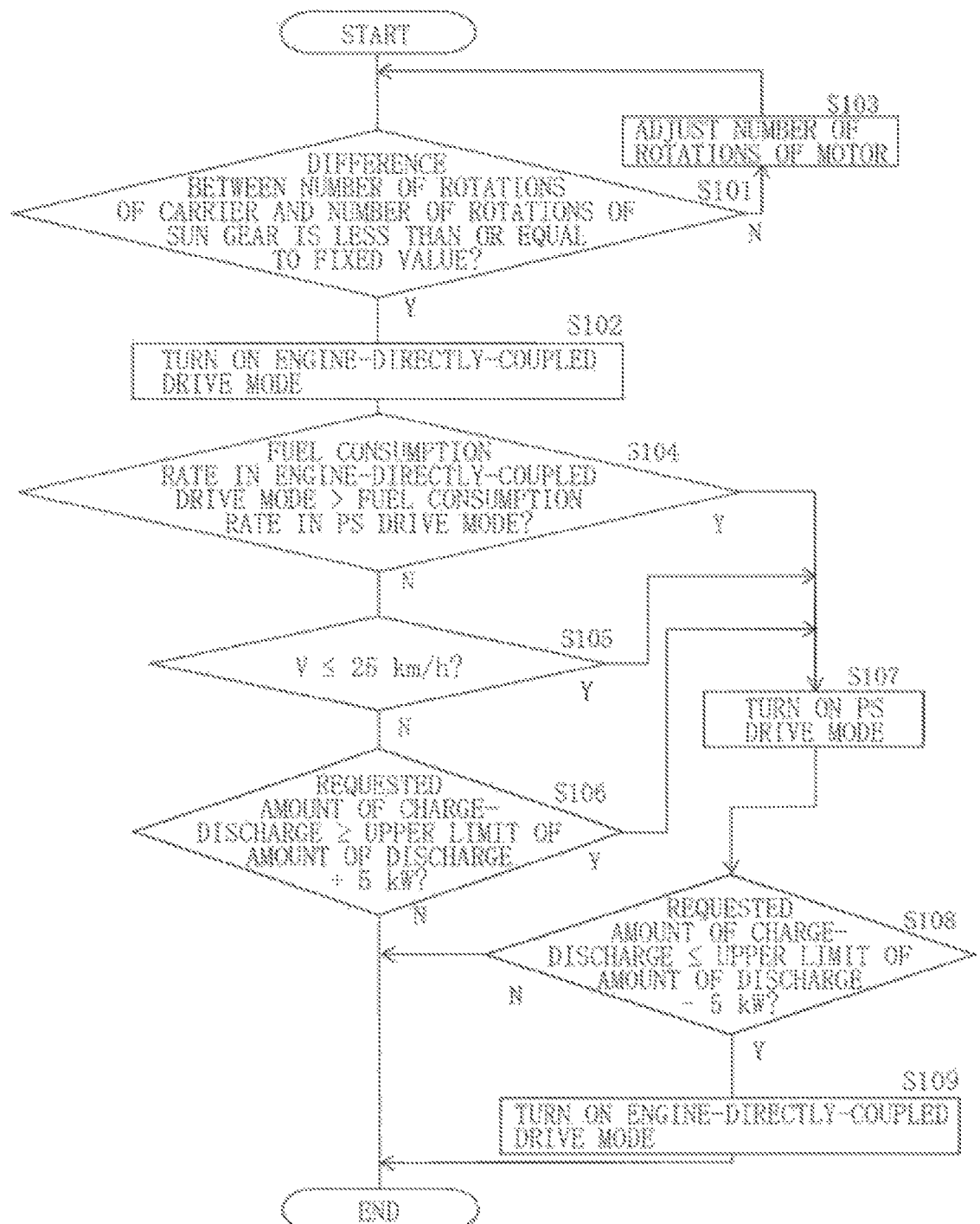
FIG. 5 is an example of a flowchart for explaining a control flow in the vehicle driving system illustrated in FIG. 1.

Next, with reference to FIG. 5, a control flow in the vehicle driving system 100 will be described. FIG. 5 is an example of a flowchart for explaining a control flow in the vehicle driving system 100. A series of control processes illustrated in FIG. 5 may be executed by the controller 4 including the HEV-ECU 42.

First, the vehicle driving system 100 may cause traveling of the vehicle to start in the electric drive mode illustrated in FIGS. 4A to 4C. Thereafter, after causing the engine 1 to start, the HEV-ECU 42 may compare the number of rotations per unit time of the carrier 35 with the number of rotations per unit time of the sun gear 31 (step S101). In step S101, the HEV-ECU 42 may determine whether or not a difference between the number of rotations per unit time of the carrier 35 and the number of rotations per unit time of the sun gear 31 is less than or equal to a fixed value. In a case where the HEV-ECU 42 determines that the difference between the number of rotations per unit time of the carrier 35 and the number of rotations per unit time of the sun gear 31 is less than or equal to the fixed value (Y in step S101), the processing proceeds to step S102, and a transition may be made from the electric drive mode (FIGS. 4A to 4C) to the engine-directly-coupled drive mode (FIGS. 3A to 3C). Alternatively, in a case where the HEV-ECU 42 determines that the difference between the number of rotations per unit time of the carrier 35 and the number of rotations per unit time of the sun gear 31 exceeds the fixed value (N in step S101), the HEV-ECU 42 may adjust the number of rotations of the MG 2 (step S103), and the processing returns to step S101.

Thereafter, the HEV-ECU 42 may compare the fuel consumption rate FC1 in the PS drive mode with the fuel consumption rate FC2 in the engine-directly-coupled drive mode (step S104). In a case where the HEV-ECU 42 determines that the fuel consumption rate FC1 is lower than the fuel consumption rate FC2 (Y in step S104), a transition may be made from the engine-directly-coupled drive mode (FIGS. 3A to 3C) to the PS drive mode (FIGS. 2A to 2C), in accordance with step S107. Alternatively, in a case where the HEV-ECU 42 determines that the fuel consumption rate FC1 is higher than or equal to the fuel consumption rate FC2 (N in step S104), the processing proceeds to step S105.

In step S105, the HEV-ECU 42 may determine whether or not a traveling speed V of the vehicle driven by the vehicle driving system 100 is lower than or equal to, for example, 25 km/h. In a case where the HEV-ECU 42 determines that the traveling speed V is lower than or equal to, for example, 25 km/h (Y in step S105), the transition may be made from the engine-directly-coupled drive mode (FIGS. 3A to 3C) to the PS drive mode (FIGS. 2A to 2C), in accordance with step S107. Alternatively, in a case where the HEV-ECU 42 determines that the traveling speed V exceeds, for example, 25 km/h (N in step S105), the processing proceeds to step S106.

In step S106, the HEV-ECU 42 may compare a requested amount of charge-discharge corresponding to a driver requested output with an upper limit of an amount of discharge of the battery 5. In one example, either one of when the requested amount of charge-discharge is determined to be larger than the upper limit of the amount of discharge of the battery 5 by a first value or more, and when the requested amount of charge-discharge is estimated to be larger than the upper limit of the amount of discharge of the battery 5 by the first value or more (Y in step S106), the HEV-ECU 42 causes the processing to proceed to step S107. In step S107, the HEV-ECU 42 may control the power transmission mechanism 3 to perform switching from the engine-directly-coupled drive mode to the PS drive mode. The first value in step S106 may be, for example, 5 kW.

Figure 6:
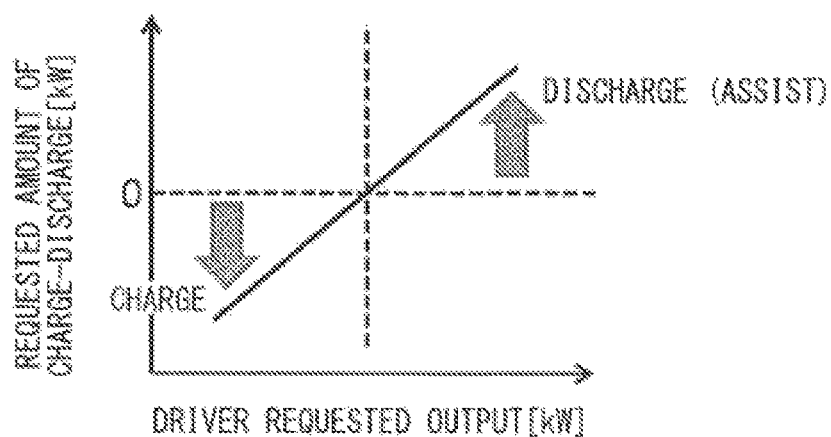
FIG. 6 is a map illustrating a relationship between a driver requested output and a requested amount of charge-discharge in the vehicle driving system illustrated in FIG. 1.

It is to be noted that, in step S106, for example, a map defining a relationship between the driver requested output and the requested amount of charge-discharge illustrated in FIG. 6 may be prepared in advance, and, on the basis of the driver requested output that may be determined by the position of the accelerator pedal, the requested amount of charge-discharge corresponding to the driver requested output may be calculated.

Figure 7:
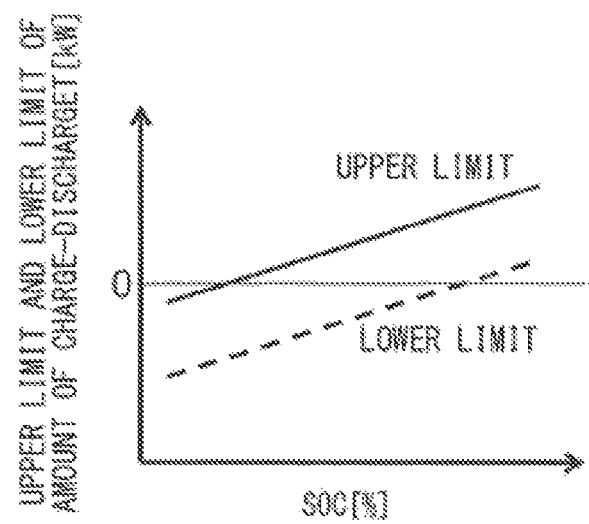
FIG. 7 is a map illustrating a relationship between a state of charge (SOC) and an upper limit of an amount of charge-discharge of a battery 5 in the vehicle driving system illustrated in FIG. 1.

Further, the upper limit of the amount of discharge of the battery 5 may be calculated from a map in FIG. 7 prepared in advance, for example, which defines a relationship between the state of charge (SOC) and the upper limit of the amount of charge-discharge of the battery 5. It is to be noted that a lower limit of the amount of charge-discharge of the battery 5 may also be calculated from a map which is also included in FIG. 7 and which defines a relationship between the state of charge (SOC) and the lower limit of the amount of charge-discharge of the battery 5. The upper limit of the amount of charge-discharge and the lower limit of the amount of charge-discharge both vary in proportion to the state of charge (SOC) of the battery 5. Further, the upper limit of the amount of charge-discharge and the lower limit of the amount of charge-discharge of the battery 5 are set to keep the state of charge (SOC) of the battery 5 within a predetermined range. On the basis of data obtained from the state of charge sensor, in a case where the state of charge (SOC) of the battery 5 is relatively high, the HEV-ECU 42 may limit charge of the battery 5, and in a case where the state of charge (SOC) of the battery 5 is relatively low, the HEV-ECU 42 may limit discharge of the battery 5. It is to be noted that, in a case where the requested amount of charge is sufficiently larger than the upper limit of the amount of charge, the state of charge (SOC) of the battery 5 may be high, and the charge of the battery 5 may be limited. In this case, the HEV-ECU 42 may control the power transmission mechanism 3 to perform switching from the engine-directly-coupled drive mode or the PS drive mode to the electric drive mode.

In step S107, the mode is switched from the engine-directly-coupled drive mode to the PS drive mode, and thereafter, the processing proceeds to step S108. In step S108, the HEV-ECU 42 may compare the requested amount of charge-discharge corresponding to the driver requested output with the upper limit of the amount of discharge of the battery 5. In one example, either one of when the requested amount of charge-discharge is determined to be smaller than the upper limit of the amount of discharge of the battery 5 by a second value or more, and when the requested amount of charge-discharge is estimated to be smaller than the upper limit of the amount of discharge of the battery 5 by the second value or more (Y in step S108), the HEV-ECU 42 causes the processing to proceed to step S109. In step S109, the HEV-ECU 42 may control the power transmission mechanism 3 to perform switching from the PS drive mode to the engine-directly-coupled drive mode. The second value in step S108 may be, for example, 5 kW.

The control flow in the vehicle driving system 100 may terminate after step S109. Further, either one of when the requested amount of charge-discharge is not determined to be larger than the upper limit of the amount of discharge of the battery 5 by the first value or more, and when the requested amount of charge-discharge is not estimated to be larger than the upper limit of the amount of discharge of the battery 5 by the first value or more in step S106 (N in step S106), the control flow in the vehicle driving system 100 may terminate straight away after step S106. Still further, either one of when the requested amount of charge-discharge is not determined to be smaller than the upper limit of the amount of discharge of the battery 5 by the second value or more, and when the requested amount of charge-discharge is not estimated to be smaller than the upper limit of the amount of discharge of the battery 5 by the second value or more in step S108 (N in step S108), the control flow in the vehicle driving system 100 may terminate straight away after step S108.

[Workings and Example Effects of Vehicle Driving System 100]

As described above, in the vehicle driving system 100 according to the example embodiment and the vehicle including the vehicle driving system 100, the controller 4 selects the PS drive mode on the basis of the comparison between the fuel consumption rate FC1 and the fuel consumption rate FC2; therefore, the fuel consumption of the engine 1 is reduced. That is, when there is a transition request from the engine-directly-coupled drive mode to the PS drive mode, the controller 4 estimates an operating point of the engine 1 at the point of making the transition to the PS drive mode, and calculates the fuel consumption rate FC1 at the estimated operating point of the engine 1. Here, either one of when the fuel consumption rate FC1 in the PS drive mode is lower than the fuel consumption rate FC2 in the engine-directly-coupled drive mode, and when the fuel consumption rate FC1 is estimated to be lower than the fuel consumption rate FC2, the power transmission mechanism 3 is controlled to select the PS drive mode. Accordingly, in the vehicle driving system 100 and the vehicle including the vehicle driving system 100, it becomes possible to drive in a drive mode whose fuel consumption rate is lower, and allowing for expectations in reduction in fuel consumption.

A hybrid electric vehicle including a transmission having a PS drive mode generally travels using the engine driving force as a main driving force. In a case where high output is required when traveling at a low speed, however, the engine operating point makes a transition to a high torque range; therefore, there is a possibility that the fuel efficiency can deteriorate. Accordingly, the PS drive mode is selected. However, the operating point in the PS drive mode only has a degree of freedom that is limited to the number of rotations of the output shaft; therefore, there is a possibility that the fuel consumption in the PS drive mode can be higher than the fuel consumption in the engine-directly-coupled drive mode depending on the traveling state of the vehicle. In this respect, the vehicle driving system 100 according to the example embodiment performs the switching between the PS drive mode and the engine-directly-coupled drive mode on the basis of the comparison between the fuel consumption rate FC1 and the fuel consumption rate FC2; therefore, the fuel consumption of the engine 1 is reduced.

Further, in the example embodiment, the transition from the engine-directly-coupled drive mode to the PS drive mode is executed, either one of when the requested amount of charge-discharge is determined to be larger than the upper limit of the amount of discharge of the battery by the first value or more, and when the requested amount of charge-discharge is estimated to be larger than the upper limit of the amount of discharge of the battery by the first value or more. Still further, the transition from the PS drive mode to the engine-directly-coupled drive mode is executed, either one of when the requested amount of charge-discharge is determined to be smaller than the upper limit of the amount of discharge of the battery by the second value or more, and when the requested amount of charge-discharge is estimated to be smaller than the upper limit of the amount of discharge of the battery by the second value or more. Thus, it is possible to prevent hunting that occurs when the switching is performed between the engine-directly-coupled drive mode and the PS drive mode.

Moreover, in the example embodiment, in a case where the traveling speed V of the vehicle is lower than or equal to the first speed, for example, lower than or equal to 25 km/h, the PS drive mode is selected regardless of a magnitude relation between the fuel consumption rate FC1 and the fuel consumption rate FC2. Thus, in a case where the number of rotations per unit time of the engine 1 changes in accordance with the traveling speed V of the vehicle, it is possible to compensate shortage of the engine driving force generated in the engine 1 based on the driver requested output with the motor driving force generated in the MG 2. As a result, it is possible to perform smooth traveling that responds to the request of the driver.

2. Modification Examples

Although some example embodiments of the technology have been described in the foregoing, the technology is by no means limited to the example embodiments. Various changes and modifications may be made to any example embodiment without departing from the scope of the technology.

For example, the ECU 41, the HEV-ECU 42, and the PCU 43 according to the foregoing example embodiment may each be an individual piece of hardware, or may be a single integrated piece of hardware.

The series of processes described in the foregoing example embodiment and modification example may be performed by hardware such as circuitry, and may be performed by software such as a program. In a case where the series of processes is performed by software, the software may be a group of programs for causing a computer to execute various operations. Each program may be a built-in program that is incorporated in the computer in advance for use. Each program may also be installed in the computer from a network or a recording medium for use, for example.

In some example embodiments of the technology, the controller may control the power transmission mechanism 3 to select the first drive mode serving as the PS drive mode, either one of when the first fuel consumption rate (FC1) is continuously determined to be lower than the second fuel consumption rate (FC2) for a predetermined period of time, and when the first fuel consumption rate (FC1) is continuously estimated to be lower than the second fuel consumption rate (FC2) for the predetermined period of time. Also in this case, it is possible to prevent hunting that occurs when the switching is performed between the first drive mode and the second drive mode.

For example, the forgoing example embodiment is illustrated as an example where the vehicle driving system is mounted on a hybrid electric vehicle. The technology is, however, not limited thereto. The technology may also be applicable to: a rotator driving system that is mounted on a movable body other than the vehicle, such as a vessel or an aircraft, and drives the rotator of the movable body; and a rotator driving system that is mounted on an apparatus that does not travel, such as construction machinery or a working robot, and drives the rotator of the apparatus.

In the driving system according to one example embodiment of the technology, the controller is configured to select the first drive mode on the basis of the comparison between the first fuel consumption rate and the second fuel consumption rate; therefore, the fuel consumption of the engine is reduced.

According to the driving system in one example embodiment of the technology, it possible to reduce the fuel consumption of the engine.

The example effects described above are merely illustrative and non-limiting. Any embodiment may achieve an effect other than the example effects described above.

The controller 4 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 4. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 4 illustrated in FIG. 1.

Although some example embodiments of the technology have been described in the foregoing by way of example with reference to the accompanying drawings, the technology is by no means limited to the example embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A driving system comprising:
    an engine configured to generate an engine driving force;
    a motor generator configured to generate a motor driving force;
    an output unit configured to output at least one of the engine driving force or the motor driving force;
    a power transmission mechanism configured to select a first drive mode and a second drive mode, the first drive mode being a mode in which both of the engine driving force and the motor driving force are transmitted to the output unit, the second drive mode being a mode in which the engine driving force, out of the engine driving force and the motor driving force, is transmitted to the output unit; and
    a controller configured to control the power transmission mechanism to select the first drive mode, either one of when a first fuel consumption rate is lower than a second fuel consumption rate, and when the first fuel consumption rate is estimated to be lower than the second fuel consumption rate, the first fuel consumption rate being a fuel consumption rate of the engine in the first drive mode, the second fuel consumption rate being a fuel consumption rate of the engine in the second drive mode,
    wherein the controller controls the power transmission mechanism to perform switching from the second drive mode to the first drive mode, either one of when a requested amount of charge-discharge corresponding to a requested output is determined to be larger than an upper limit of an amount of discharge of a battery by a first value or more, and when the requested amount of charge-discharge corresponding to the requested output is estimated to be larger than the upper limit of the amount of discharge of the battery by the first value or more, and wherein the controller controls the power transmission mechanism to select the second drive mode, either one of when the requested amount of charge-discharge corresponding to the requested output is determined to be smaller than the upper limit of the amount of discharge of the battery by a second value or more, and when the requested amount of charge-discharge corresponding to the requested output is estimated to be smaller than the upper limit of the amount of discharge of the battery by the second value or more.

2. The driving system according to claim 1, wherein the driving system is configured to drive a vehicle, and the controller controls, when a traveling speed of the vehicle is lower than a first speed, the power transmission mechanism to select the first drive mode regardless of a magnitude relation between the first fuel consumption rate and the second fuel consumption rate.

3. The driving system according to claim 1, wherein the controller controls the power transmission mechanism to select the first drive mode, either one of when the first fuel consumption rate is determined to be lower than the second fuel consumption rate continuously for a predetermined time period, and when the first fuel consumption rate is estimated to be lower than the second fuel consumption rate continuously for the predetermined time period.

4. A driving system comprising:
an engine configured to generate an engine driving force;
a motor generator configured to generate a motor driving force;
an output unit configured to output at least one of the engine driving force or the motor driving force;
a power transmission mechanism configured to select a first drive mode and a second drive mode, the first drive mode being a mode in which both of the engine driving force and the motor driving force are transmitted to the output unit, the second drive mode being a mode in which the engine driving force, out of the engine driving force and the motor driving force, is transmitted to the output unit;
a controller configured to control the power transmission mechanism to select the first drive mode, either one of when a first fuel consumption rate is lower than a second fuel consumption rate, and when the first fuel consumption rate is estimated to be lower than the second fuel consumption rate, the first fuel consumption rate being a fuel consumption rate of the engine in the first drive mode, the second fuel consumption rate being a fuel consumption rate of the engine in the second drive mode;
a battery configured to supply the motor generator with electric power that drives the motor generator,
wherein the controller controls, when a traveling speed of a vehicle is lower than a first speed, the power transmission mechanism to select the first drive mode regardless of a magnitude relation between the first fuel consumption rate and the second fuel consumption rate, and
wherein the controller controls the power transmission mechanism to select the second drive mode, either one of when a requested amount of charge-discharge corresponding to a requested output is determined to be smaller than an upper limit of an amount of discharge of the battery by a first value or more, and when the requested amount of charge-discharge corresponding to the requested output is estimated to be smaller than the upper limit of the amount of discharge of the battery by the first value or more.

5. A driving system to be applied to a vehicle, the driving system comprising:
an engine configured to generate an engine driving force to rotate an engine output shaft;
a motor generator configured to generate a motor driving force to rotate an input-output shaft;
a power transmission mechanism comprising
a driving shaft coupled to the input-output shaft of the motor,
a sun gear fixed to the driving shaft,
a pinion gear meshed with the sun gear,
a carrier supporting the pinion gear and rotating around a rotating axis of the driving shaft,
a ring gear meshed with the pinion gear and coupled to the engine output shaft, and
a clutch disposed between the driving shaft and the carrier, the clutch configured to switch i) an engaged state in which the driving shaft and the carrier rotate integratedly and ii) a disengaged state in which the driving shaft and the carrier rotate independently;
an output unit configured to couple the carrier and a wheel of the vehicle; and
a controller configured to control the clutch to be in the disengaged state, when either one of when a first fuel consumption rate is lower than a second fuel consumption rate, and when the first fuel consumption rate is estimated to be lower than the second fuel consumption rate, the first fuel consumption rate being a fuel consumption rate of the engine in a case where the clutch is in the disengaged state, the second fuel consumption rate being a fuel consumption rate of the engine in a case where the clutch is in the engaged state.

6. The driving system according to claim 5, wherein the controller controls the clutch to be in the disengaged state when a traveling speed of the vehicle is lower than a first speed, the clutch regardless of a magnitude relation between the first fuel consumption rate and the second fuel consumption rate.

7. The driving system according to claim 6, further comprising a battery configured to supply the motor generator with electric power that drives the motor generator,
wherein the controller controls the clutch to be in the disengaged state, either one of when a requested amount of charge-discharge corresponding to a requested output is determined to be larger than an upper limit of an amount of discharge of the battery by a first value or more, and when the requested amount of charge-discharge corresponding to the requested output is estimated to be larger than the upper limit of the amount of discharge of the battery by the first value or more.

8. The driving system according to claim 7, wherein the controller controls the clutch to be in the engaged state, either one of when the requested amount of charge-discharge corresponding to the requested output is determined to be smaller than the upper limit of the amount of discharge of the battery by a second value or more, and when the requested amount of charge-discharge corresponding to the requested output is estimated to be smaller than the upper limit of the amount of discharge of the battery by the second value or more.

9. The driving system according to claim 6, further comprising a battery configured to supply the motor generator with electric power that drives the motor generator,
wherein the controller controls the clutch to be in the engaged state, either one of when a requested amount of charge-discharge corresponding to a requested output is determined to be smaller than an upper limit of an amount of discharge of the battery by a first value or more, and when the requested amount of charge-discharge corresponding to the requested output is estimated to be smaller than the upper limit of the amount of discharge of the battery by the first value or more.

10. The driving system according to claim 5, further comprising a battery configured to supply the motor generator with electric power that drives the motor generator,
wherein the controller controls the clutch to be in the disengaged state, either one of when a requested amount of charge-discharge corresponding to a requested output is determined to be larger than an upper limit of an amount of discharge of the battery by a first value or more, and when the requested amount of charge-discharge corresponding to the requested output is estimated to be larger than the upper limit of the amount of discharge of the battery by the first value or more.

11. The driving system according to claim 10, wherein the controller controls the clutch to be in the engaged state, either one of when the requested amount of charge-discharge corresponding to the requested output is determined to be smaller than the upper limit of the amount of discharge of the battery by a second value or more, and when the requested amount of charge-discharge corresponding to the requested output is estimated to be smaller than the upper limit of the amount of discharge of the battery by the second value or more.

12. The driving system according to claim 5, further comprising a battery configured to supply the motor generator with electric power that drives the motor generator,
wherein the controller controls the clutch to be in the engaged state, either one of when a requested amount of charge-discharge corresponding to a requested output is determined to be smaller than an upper limit of an amount of discharge of the battery by a first value or more, and when the requested amount of charge-discharge corresponding to the requested output is estimated to be smaller than the upper limit of the amount of discharge of the battery by the first value or more.

13. The driving system according to claim 5, wherein the controller controls the clutch to be in the disengaged state, either one of when the first fuel consumption rate is determined to be lower than the second fuel consumption rate continuously for a predetermined time period, and when the first fuel consumption rate is estimated to be lower than the second fuel consumption rate continuously for the predetermined time period.

* * * * *